(12) United States Patent
Duddey

(10) Patent No.: US 6,390,163 B1
(45) Date of Patent: May 21, 2002

(54) TREAD RUBBER FOR HIGH TRACTION TIRES

(75) Inventor: James Edward Duddey, Akron, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/390,414

(22) Filed: Sep. 3, 1999

Related U.S. Application Data

(60) Provisional application No. 60/103,671, filed on Oct. 9, 1998.

(51) Int. Cl.[7] .................. B60L 11/00; C08L 25/10
(52) U.S. Cl. ............ 152/209.1; 152/905; 524/261; 524/571; 525/99; 525/191; 525/241
(58) Field of Search ................. 524/262, 572, 524/571, 261; 525/237, 332.8, 99, 98, 240, 236; 526/337, 335, 174; 152/209 R, 450, 905

(56) References Cited

U.S. PATENT DOCUMENTS 5,405,927 A * 4/1995 Hsu et al. ............ 526/337
5,859,133 A * 1/1999 Zanzig et al. ............ 525/99

* cited by examiner

*Primary Examiner*—David W. Wu
*Assistant Examiner*—R. Harlan
(74) *Attorney, Agent, or Firm*—Alvin T. Rockhill

(57) ABSTRACT

The subject invention is based upon the unexpected discovery that tires having outstanding dry and wet traction characteristics, including wet skid resistance, can be made by incorporating certain blends of styrene-butadiene rubber (SBR) and isoprene-butadiene rubber (IBR) into the treads thereof without greatly sacrificing rolling resistance and tread wear characteristics. This invention more specifically discloses a tire tread rubber composition which is comprised of (a) about 50 phr to about 85 phr of a SBR and (b) about 15 phr to about 50 phr of an IBR, wherein the IBR is comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in the IBR are 1,2-polybutadiene units, wherein from about 50 percent to about 70 percent of the repeat units in the IBR are 1,4-polybutadiene units, wherein from about 1 percent to about 4 percent of the repeat units in the IBR are 3,4-polyisoprene units, wherein from about 25 percent to about 40 percent of the repeat units in the IBR are 1,4-polyisoprene units, wherein the IBR has a glass transition temperature which is within the range of about −90° C. to about −75° C. and wherein the IBR has a Mooney viscosity which is within the range of about 55 to about 140.

19 Claims, No Drawings

TREAD RUBBER FOR HIGH TRACTION TIRES

This application claims the benefit of U.S. Provisional Application No. 60/103,671 filed Oct. 9, 1998.

BACKGROUND OF THE INVENTION

The ability to maintain good traction on both wet and dry pavements is a highly desirable characteristic for a tire. It is also normally desirable for the tire to provide good treadwear and low rolling resistance. In order to reduce the rolling resistance of a tire, rubbers having a high rebound can be utilized in making the tires' treads. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. To further improve traction characteristics, silica is also commonly included in the tread rubber as a filler. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene and butadiene having multiple glass transition temperatures and having an excellent combination of properties for use in making tire treads which comprises terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur-cured rubber composition comprised of, based on 100 parts by weight rubber (phr), (A) about 10 to about 90 parts by weight of a styrene, isoprene, butadiene terpolymer rubber (SIBR) and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further, the said bound butadiene structure contains about 30 to about 40 percent 1,2-vinyl units, the said bound isoprene structure contains about 10 to about 30 percent 3,4-units and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene and from about 55 weight percent to about 88 weight percent 1,3-butadiene, wherein the repeat units derived from styrene, isoprene and 1,3-butadiene are in essentially random order, wherein from about 25 percent to about 40 percent of the repeat units derived from the 1,3-butadiene are of the cis-microstructure, wherein from about 40 percent to about 60 percent of the repeat units derived from the 1,3-butadiene are of the trans-microstructure, wherein from about 5 percent to about 25 percent of the repeat units derived from the 1,3-butadiene are of the vinyl-microstructure, wherein from about 75 percent to about 90 percent of the repeat units derived from the isoprene are of the 1,4-microstructure, wherein from about 10 percent to about 25 percent of the repeat units derived from the isoprene are of the 3,4 -microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000 and wherein the rubber has an inhomogeneity which is within the range of about 0.5 to about 1.5.

U.S. Pat. No. 5,405,927 discloses an isoprene-butadiene rubber which is reported to be particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in said rubber are 1,2-polybutadiene units, wherein from about 50 percent to about 70 percent of the repeat units in said rubber are 1,4-polybutadiene units, wherein from about 1 percent to about 4 percent of the repeat units in said rubber are 3,4-polyisoprene units, wherein from about 25 percent to about 40 percent of the repeat units in the polymer are 1,4-polyisoprene units, wherein the rubber has a glass transition temperature which is within the range of about −90° C. to about −75° C. and wherein the rubber has a Mooney viscosity which is within the range of about 55 to about 140. U.S. Pat. No. 5,405,927 specifically discloses blends of this isoprene-butadiene rubber with natural rubber or 3,4-polyisoprene.

SUMMARY OF THE INVENTION

It has been unexpectedly found that tires having outstanding dry and wet traction characteristics can be made by incorporating certain blends of styrene-butadiene rubber (SBR) and isoprene-butadiene rubber (IBR) into the treads thereof. More importantly, this improvement in traction characteristics, including wet skid resistance, can be achieved without greatly sacrificing rolling resistance and tread wear characteristics. These rubber blends will typically contain from about 50 phr to about 85 phr of the SBR and from about 15 phr to about 50 phr of the IBR. The IBR will normally be comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in the isoprene-butadiene rubber are 1,2-polybutadiene units, wherein from about 50 percent to about 70 percent of the repeat units in the isoprene-butadiene rubber are 1,4-polybutadiene units, wherein from about 1 percent to about 4 percent of the repeat units in the isoprene-butadiene rubber are 3,4-polyisoprene units, wherein from about 25 percent to about 40 percent of the repeat units in the isoprene-butadiene rubber are 1,4-polyisoprene units, wherein the isoprene-butadiene rubber has a glass transition temperature which is within the range of about −90° C. to about −75° C. and wherein the isoprene-butadiene rubber has a Mooney viscosity which is within the range of about 55 to about 140.

The subject invention more specifically discloses a tire tread rubber composition which is comprised of (a) about 50 phr to about 85 phr of a styrene-butadiene rubber and (b) about 15 phr to about 50 phr of an isoprene-butadiene rubber, wherein the isoprene-butadiene rubber is comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in the isoprene-butadiene rubber are 1,2-polybutadiene units, wherein from about 50 percent to about 70 percent of the repeat units in the isoprene-butadiene rubber are 1,4-polybutadiene units, wherein from about 1 percent to about 4 percent of the repeat units in the isoprene-butadiene rubber are 3,4-polyisoprene units, wherein from about 25 percent to about 40 percent of the repeat units in the isoprene-butadiene rubber are 1,4-polyisoprene units, wherein the isoprene-butadiene rubber has a glass transition temperature which is within the range of about −90° C. to about −75° C. and wherein the isoprene-butadiene rubber has a Mooney viscosity which is within the range of about 55 to about 140.

The subject invention further discloses a pneumatic tire having an outer circumferential tread wherein said tread is a sulfur-cured rubber composition comprised of (a) about 50 phr to about 85 phr of a styrene-butadiene rubber and (b) about 15 phr to about 50 phr of an isoprene-butadiene rubber, wherein the isoprene-butadiene rubber is comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in the isoprene-butadiene rubber are 1,2-polybutadiene units, wherein from about 50 percent to about 70 percent of the repeat units in the isoprene-butadiene rubber are 1,4-polybutadiene units, wherein from about 1 percent to about 4 percent of the repeat units in the isoprene-butadiene rubber are 3,4-polyisoprene units, wherein from about 25 percent to about 40 percent of the repeat units in the isoprene-butadiene rubber are 1,4-polyisoprene units, wherein the isoprene-butadiene rubber has a glass transition temperature which is within the range of about −90° C. to about −75° C. and wherein the isoprene-butadiene rubber has a Mooney viscosity which is within the range of about 55 to about 140.

The IBR used in the tire tread rubber blends of this invention is prepared by solution polymerization utilizing an organolithium initiator. The process used in synthesizing this IBR is conducted as a continuous process which is carried out at a temperature which is within the range of about 70° C. to about 140° C. Gel buildup can be inhibited by conducting such polymerizations in the presence of a trace amount of a polar modifier, such as N,N,N',N'-tetramethylethylene-diamine (TMEDA).

DETAILED DESCRIPTION OF THE INVENTION

The IBR used in the tire tread rubber blends of this invention can be synthesized by solution polymerization using the process described in U.S. Pat. No. 5,405,927. The teachings of U.S. Pat. No. 5,405,927 are incorporated herein by reference in their entirety. Such solution polymerizations will normally be carried out in a hydrocarbon solvent which can be one or more aromatic, paraffinic or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene and the like, alone or in admixture.

In the solution polymerizations employed in synthesizing, the IBR there will normally be from about 5 to about 35 weight percent monomers in the polymerization medium. Such polymerization media are, of course, comprised of the organic solvent, 1,3-butadiene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the synthesis of the IBR used in the tire tread rubber compounds of this invention will typically contain from about 20 weight percent to about 50 weight percent isoprene and from about 50 weight percent to about 80 weight percent 1,3-butadiene monomer. It is typically preferred for the monomer charge composition to contain from about 25 weight percent to about 35 weight percent isoprene and from about 65 weight percent to about 85 weight percent 1,3-butadiene.

The IBR is typically synthesized on a continuous basis. In such a continuous process, the monomers and an organolithium initiator are continuously fed into a reaction vessel or series of reaction vessels. The pressure in the reaction vessel is typically sufficient to maintain a substantially liquid phase under the conditions of the polymerization reaction. The reaction medium will generally be maintained at a temperature which is within the range of about 70° C. to about 140° C. throughout the copolymerization. This is generally preferred for the copolymerization to be conducted in a series of reaction vessels and for the reaction temperature to be increased from reaction vessel to reaction vessel as the polymerization proceeds. For instance, it is desirable to utilize a two reactor system wherein the temperature in the first reactor is maintained within the range of about 70° C. to 90° C. and wherein the temperature in the second reactor is maintained within the range of about 90° C. to about 100° C.

The organolithium compounds which can be utilized as initiators include organomonolithium compounds and organomonofunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl and the like.

The organolithium compounds which can be utilized are normally organomonolithium compounds. The organolithium compounds which are preferred can be represented by the formula R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium.

The amount of organolithium initiator employed will be dependent upon the molecular weight which is desired for the IBR being synthesized. An amount of organolithium initiator will be selected to result in the production of IBR having a Mooney ML1+4 viscosity which is within the range of 55 to 140. The amount of organolithium initiator will preferably be selected to result in the production of IBR having a Mooney ML1+4 viscosity which is within the range of 60 to 100. The amount of organolithium initiator will more preferably be selected to result in the production of an IBR having a Mooney ML1+4 viscosity which is within the range of about 70 to 90. The IBR will most preferably have a Mooney ML1+4 viscosity which is within the range of about 80 to about 85.

As a general rule in all anionic polymerizations, the molecular weight (Mooney viscosity) of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is important to carry out such polymerizations in the presence of a trace amount of a polar modifier, such as N,N,N',N'-tetramethylethylenediamine (TMEDA). For this reason, it is highly desirable to continuously feed a polar modifier into the reaction vessel utilized. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA and tetrahydrofuran are representative of highly preferred modifiers. U.S. Pat. No. 4,022,959 describes the use of ethers and tertiary amines as polar modifiers in greater detail.

Optionally, 1,2-butadiene can also be continuously fed into the reaction zone. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm.

The polar modifier will typically be present at a molar ratio of the polar modifier to the organolithium compound which is within the range of about 0.01:1 to about 0.2:1. A molar ratio of polar modifier to the organolithium initiator of greater than about 0.2:1 should not be exceeded because the polar modifier acts to increase the glass transition temperature of the IBR produced.

To keep the glass transition temperature of the IBR within the desired range of about $-90°$ C. to about $-75°$ C., the amount of polar modifier employed should be the minimum amount required to inhibit gelation. A molar ratio of polar modifier to the organolithium compound of greater than about 0.2:1 will typically not be exceeded because such high ratios of polar modifier to the organolithium compound can result in the IBR produced having a glass transition temperature of greater than $-70°$ C. As a general rule, a molar ratio of polar modifier to the organolithium compound which is within the range of about 0.05:1 to about 0.15:1 will be employed. It is typically more preferred for the molar ratio of polar modifier to the organolithium compound to be within the range of about 0.08:1 to about 0.12:1.

After a monomer conversion of about 70 percent to about 100 percent is achieved, the living intermediate polymer can optionally be partially coupled with divinyl benzene, tin tetrachloride or silicon tetrachloride. This is typically done in a second reaction vessel. For instance, the living intermediate polymer can be pumped from a first reaction vessel to a second reaction vessel where the coupling agent is added to the polymerization medium. The coupling agent is preferably added after a monomer conversion of 72 percent to 90 percent has been attained and is more preferably added after a monomer conversion of 75 percent to 85 percent has been attained.

The coupling agent is added at a level which is sufficient to jump the molecular weight of the polymer to the desired degree without killing all of the living intermediate polymer chains. In the absence of coupling agents, all of the polymer chains can grow to completion (but no molecular weight jumping can occur). At a molar ratio of organolithium initiator to coupling agent of 4 or greater, complete coupling is possible; but because the coupling is by termination, further polymerization and higher levels of conversion cannot be attained. The optimum level is, of course, between these two extremes. As a general rule, the molar ratio of organolithium compound to the coupling agent will be within the range of about 6:1 to about 20:1. Molar ratios of the organolithium compound to the coupling agent which are within the range of about 8:1 to about 12:1 are preferred because they induce sufficient coupling to achieve the desired increase in molecular weight while leaving an adequate number of living chains to attain acceptable conversion levels. Since there are fewer living chains after the coupling, those that are still living attain a higher molecular weight than would otherwise have been achieved had the coupling agent not been employed.

Since the living intermediate polymer is only partially coupled, living polymer chains still exist after the coupling step. Accordingly, in such a scenario, the copolymerization is allowed to continue with the still living polymer chains increasing in molecular weight as the copolymerization continues. The copolymerization is then allowed to continue in this step until a conversion in excess of about 90 percent is attained. It is preferred for the conversion to be in excess of about 95 percent with essentially quantitative conversions of greater than about 99 percent preferably being reached.

The IBR produced is then recovered from the organic solvent. The IBR can be recovered from the organic solvent by standard techniques, such as decantation, filtration, centrification and the like. It is often desirable to precipitate the IBR from the organic solvent by the addition of lower alcohols containing from 1 to about 4 carbon atoms to the polymer solution. Suitable lower alcohols for precipitation of the IBR from the polymer cement include methanol, ethanol, isopropyl alcohol, n-propyl alcohol and t-butyl alcohol. The utilization of lower alcohols to precipitate the IBR from the polymer cement also "kills" the living IBR chains by inactivating lithium end groups. After the IBR is recovered from the organic solvent, steam-stripping can be employed to reduce the level of volatile organic compounds in the rubber.

The IBR used in the tire tread rubber blends of this invention is characterized by being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in said rubber are 1,2-polybutadiene units, wherein from about 50 percent to about 70 percent of the repeat units in said rubber are 1,4-polybutadiene units, wherein from about 1 percent to about 4 percent of the repeat units in said rubber are 3,4-polyisoprene units, wherein from about 25 percent to about 40 percent of the repeat units in the polymer are 1,4-polyisoprene units, wherein the rubber has a glass transition temperature which is within the range of about −90° C. to about −75° C. and wherein the rubber has a Mooney viscosity which is within the range of about 55 to about 140. The isoprene-butadiene rubber will preferably have a Mooney ML1+4 viscosity which is within the range of about 60 to about 100.

The repeat units in the IBR will preferably be derived from about 30 weight percent to about 40 weight percent isoprene and from about 60 weight percent to about 70 weight percent 1,3-butadiene, wherein the repeat units derived from isoprene and 1,3-butadiene are in essentially random order, wherein from about 5 percent to about 8 percent of the repeat units in said rubber are 1,2-polybutadiene units, wherein from about 55 percent to about 65 percent of the repeat units in said rubber are 1,4-polybutadiene units, wherein from about 1 percent to about 3 percent of the repeat units in said rubber are 3,4-polyisoprene units, wherein from about 28 percent to about 36 percent of the repeat units in the polymer are 1,4-polyisoprene units, wherein the rubber has a glass transition temperature which is within the range of about −85° C. to about −80° C. and wherein the rubber has a Mooney viscosity which is within the range of about 70 to about 90.

The repeat units which are derived from isoprene or 1,3-butadiene differ from the monomer from which they were derived in that a double bond was consumed by the polymerization reaction. The repeat units derived from isoprene and 1,3-butadiene are in the IBR in an essentially random order. The term "random" as used herein means that the repeat units which are derived from isoprene are well dispersed throughout the polymer and are mixed in with repeat units which are derived from 1,3-butadiene. For purposes of this patent, "random" means that over 60 percent of the isoprene in the IBR is present in blocks of three or less repeat units.

For purposes of this patent application, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

The IBR of this invention is particularly valuable for use in making pneumatic tires which have better traction characteristics. The IBR is blended with styrene-butadiene rubber (SBR) in making these tire tread compounds. The SBR used is typically synthesized by an emulsion polymerization process. SBR made by emulsion polymerization is frequently referred to as "emulsion styrene-butadiene rubber" or "emulsion SBR." Such blends will normally contain from about 50 phr (parts by weight per 100 parts by weight of rubber) to about 85 phr of the SBR and from about 15 phr to about 50 phr of the IBR. Such tire tread rubber blends will more typically contain from about 55 phr to about 80 phr of the SBR and from about 20 phr to about 45 phr of the IBR. It is preferred for the tread rubber compounds of this invention to contain from about 60 phr to about 75 phr of the SBR and from about 25 phr to about 40 parts of the IBR. The most preferred tire tread rubber blends will contain from about 65 phr to about 70 phr of the SBR and from about 30 phr to about 35 phr of the IBR.

These IBR containing tread rubber blends of this invention can be compounded utilizing conventional ingredients and standard techniques. For instance, the IBR containing blends will typically be blended with carbon black, sulfur, fillers, accelerators, oils, waxes, scorch inhibiting agents and processing aids. In most cases, the IBR containing rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally, from 30 to 150 phr of at least one filler will be utilized in the blend with 50 to 90 phr being preferred. It is typically more preferred to include from 60 phr to about 80 phr of fillers in the tread rubber compound. In most cases, at least some carbon black will be utilized in the filler. The filler can, of course, be comprised totally of carbon black. Silica can be included in the filler to improve tear resistance and heat buildup. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The IBR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

The silica that can optionally be utilized in the tread rubber compounds of this invention can be any of the common siliceous pigments used in rubber compounding applications, such as pyrogenic and precipitated siliceous pigments (silica), although precipitate silicas are preferred. Siliceous pigments are preferred; for instance, precipitated silicas such as those obtained by the acidification of a soluble silicate (sodium silicate).

Such silicas might be characterized, for example, by having a BET surface area, as measured using nitrogen gas, preferably in the range of about 40 to about 600 and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400 and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

In cases where silica is included in the tread compound, a silica coupling agent will also normally be included in the blend to fully realize the total benefit of including silica in the blend. The silica coupling agent will typically be a sulfur containing organosilicon compound. Examples of suitable sulfur-containing organosilicon compounds are of the formula:

$$Z-Alk-S_n-Alk-Z \quad (I)$$

in which Z is selected from the group consisting of

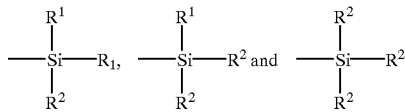

where $R^1$ is an alkyl group of 1 to 4 carbon atoms, cyclohexyl or phenyl; wherein $R^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8.

Specific examples of sulfur-containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide and 3,3-bis(dimethoxyphenylsilyl-2-methylpropyl) disulfide.

Some preferred sulfur-containing organosilicon compounds include 3,3'-bis(trimethoxy or triethoxy silylpropyl) sulfides. A highly preferred compound is 3,3'-bis(triethoxysilylpropyl) tetrasulfide. Therefore, as to Formula I, preferably Z is

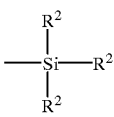

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred. Another highly preferred class of sulfur-containing organosilicon compounds are the 3,3'-bis(trimethoxy or triethoxy silyl propyl) polysulfides; such as, 3,3'-bis(triethoxysilylpropyl) polysulfide.

The amount of the sulfur-containing organosilicon compound of Formula I in a rubber composition will vary, depending on the level of silica that is used. Generally speaking, the amount of the compound of Formula I will range from about 0.01 to about 1.0 parts by weight per part by weight of the silica. Preferably, the amount will range from about 0.02 to about 0.4 parts by weight per part by weight of the silica. More preferably, the amount of the compound of Formula I will range from about 0.05 to about 0.25 parts by weight per part by weight of the silica. It is to be appreciated that the silica coupler may be used in conjunction with carbon black; namely, premixed with carbon black prior to addition to the rubber composition, and such carbon black is to be included in the aforesaid amount of carbon black for the rubber composition formulation.

In cases where the tire tread rubber formulation includes silica and a silica coupling agent, it will typically be mixed utilizing a thermomechanical mixing technique. The mixing of the tire tread rubber formulation can be accomplished by methods known to those having skill in the rubber mixing art. For example, the ingredients are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber, silica and sulfur-containing organosilicon, and carbon black, if used, are mixed in one or more non-productive mix stages. The terms "non-productive" and "productive" mix stages are well known to those having skill in the rubber mixing art. The sulfur-vulcanizable rubber composition containing the sulfur-containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The IBR containing rubber blends of this invention can be used in tire treads in conjunction with ordinary tire manufacturing techniques. Tires are built utilizing standard procedures with the IBR simply being substituted for the rubber compounds typically used as the tread rubber. After the tire has been built with the IBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment, IBR was synthesized in a two-reactor (10 liters each) continuous system at 95° C. A premix containing isoprene and 1,3-butadiene in hexane was charged into the first polymerization reactor continuously at a rate of 100 grams/minute. The premix monomer solution containing a ratio of isoprene to 1,3-butadiene of 30:70 and had a total monomer concentration of 11 percent. Polymerization was initiated by adding a 0.107 M solution of n-butyllithium into the first reactor at a rate of 0.32 grams/minute. The residence time for both reactors was set at 1.16 hours. The average monomer conversions were determined to be 62 percent for the first reactor and 93 percent for the second reactor.

The polymerization medium was continuously pushed over from the second reactor to a holding tank which contained methanol (as a shortstop) and an antioxidant. The resulting polymer cement was then steam-stripped and the IBR recovered was dried in a vacuum over at a temperature of 60° C. The isoprene distribution in the IBR was random since the isoprene and butadiene monomers were continuously pumped into the reactors. The polymer was determined to have a glass transition temperature at −84° C. and have a Mooney ML-4 viscosity of 85. It was also determined to have a microstructure which contained 6 percent 1,2-polybutadiene units, 60 percent 1,4-polybutadiene units, 32 percent 1,4-polyisoprene units and 2 percent 3,4-polyisoprene units.

EXAMPLE 2

In this experiment, isoprene-butadiene copolymer (IBR) having a low vinyl content was synthesized using an unmodified n-butyllithium catalyst. In the procedure used, 10,900 grams of a silica/molecular sieve/alumina dried premix containing isoprene and 1,3-butadiene in hexane was charged into a five-gallon (19 liters) reactor. The premix monomer solution contained a ratio of isoprene to 1,3-butadiene of 25:75 and the total monomer concentration was 19 percent. The monomer premix solution had been previously scavenged for impurities with an n-butyllithium solution. Polymerization was initiated by the addition of 4.18 ml of a 1.6 M solution of n-butyllithium. The reactor was maintained at a temperature of about 65° C. until essentially complete monomer conversion had been achieved which took about three hours. The polymerization medium was then shortstopped with ethanol and the polymer was stabilized with 1 phr (parts per hundred parts of polymer) of an antioxidant. After evaporating hexane, the recovered polymer was dried in a vacuum oven at 50° C. The isoprene-butadiene copolymer produced was determined to have glass transition temperature (Tg) at −88° C. It was also determined to have a microstructure which contained 7 percent 1,2-polybutadiene units, 68 percent 1,4-polybutadiene units, 1 percent 3,4-polyisoprene units and 24 percent 1,4-polyisoprene units.

EXAMPLES 3–7

The procedure described in Example 1 was utilized in these examples except that the isoprene to butadiene ratios were changed from 25:75 to 35:65, 40:60, 50:50, 60:40 and 75:25. The Tgs and microstructures of the resulting isoprene-butadiene copolymers are listed in Table I.

TABLE I

Low Tg Isoprene-Butadiene Copolymers

| Ex No | Isop/Bd Ratios | Tg (° C.) | Microstructure (%) | | | |
|---|---|---|---|---|---|---|
| | | | 1,2-PBd | 1,4-PBd | 3,4-PI | 1,4-PI |
| 2 | 25:75 | −88 | 7 | 68 | 1 | 24 |
| 3 | 36:65 | −86 | 6 | 59 | 3 | 32 |
| 4 | 40:60 | −84 | 6 | 54 | 3 | 37 |
| 5 | 50:50 | −81 | 5 | 46 | 3 | 46 |
| 6 | 60:40 | −77 | 4 | 37 | 4 | 55 |
| 7 | 75:25 | −72 | 4 | 24 | 4 | 68 |

EXAMPLE 8

In this experiment, a tire was built using the tread compound of this invention and compared to a tire that was built using a conventional tread compound. The conventional tread compound used in the control tire was a 70/30 blend of emulsion SBR with Budene® 1207 high cis-1,4-polybutadiene rubber. The emulsion SBR used contained 25 percent bound styrene and had a glass transition temperature of −52° C. The experimental tire was built utilizing a tread compound that was a 70/30 blend of the emulsion SBR with an IBR. The IBR had a microstructure that included 9 percent vinyl polybutadiene repeat units, 59 percent cis polybutadiene repeat units, 3 percent 3,4-polyisoprene repeat units and 29 percent cis polyisoprene repeat units. The IBR had a glass transition temperature of −83° C., a Mooney ML1+4 viscosity of 82, a dilute solution viscosity of 3.08, a number average molecular weight of 208,000 and a weight average molecular weight of 484,000.

The experimental tire had a projected mileage of 46,356 miles as compared to the control tire which had a projected milage of 51,475 miles. The experimental tire of this invention was also compared with the conventional tire to evaluate traction characteristics. The results of this comparison are shown in Table II.

TABLE II

Trailer Traction

| Test Condition | Control Tire | Experimental Tire |
|---|---|---|
| 20 MPH Peak, Wet | 120+ | 128+ |
| 40 MPH Peak, Wet | 127+ | 132+ |
| 60 MPH Peak, Wet | 111+ | 118+ |
| 40 MPH Peak, Dry | 106+ | 106+ |
| 20 MPH Slide, Wet | 125+ | 127+ |
| 40 MPH Slide, Wet | 123+ | 126+ |
| 60 MPH Slide, Wet | 113+ | 114+ |
| 40 MPH Slide, Dry | 109+ | 109+ |

As can be seen from Table II, the experimental tire built with the tread compound of this invention proved to have superior wet traction and equivalent dry traction to the control tire. The experimental tires were also compared with the control tires in a subjective wet handling test. In this test, the tires were mounted on a test automobile and subjectively evaluated for various characteristics. With the experimental tires, the test driver was able to achieve a better average lap time (57.12 seconds) than could be achieved with the control tires (57.69 seconds). The test driver reported that the experimental tires had better steering response, oversteer, off throttle oversteer, power-on oversteer, off throttle understeer, traction transition, lateral grip and breaking action than did the control tires. However, the test driver reported that the experimental tires exhibited equivalent acceleration traction and slightly inferior resistance to straight line and lateral hydroplaning. In any case, the overall wet traction characteristics of the experimental tire made with the tread rubber compound of this invention were superior to those of the control tire.

While certain representative embodiments and details have been shown for the purpose of illustrating the subject invention, it will be apparent to those skilled in this art that various changes and modifications can be made therein without departing from the scope of the subject invention.

What is claimed is:

1. A tire tread rubber composition which is comprised of (a) 55 phr to about 85 phr of a styrene-butadiene rubber and (b) about 15 phr to 45 phr of an isoprene-butadiene rubber, wherein the isoprene-butadiene rubber is comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3 percent to about 10 percent of the repeat units in the isoprenebutadiene rubber are 1,2-polybutadiene units, wherein from about 50 percent to about 70 percent of the repeat units in the isoprene-butadiene rubber are 1,4-polybutadiene units, wherein from about 1 percent to about 4 percent of the repeat units in the isoprene-butadiene rubber are 3,4-polyisoprene units, wherein from about 25 percent to about 40 percent of the repeat units in the isoprene-butadiene rubber are 1,4-polyisoprene units, wherein the isoprene-butadiene rubber has a glass transition temperature which is within the range of about −90° C. to about −75° C. and wherein the isoprene-butadiene rubber has a Mooney viscosity which is within the range of about 55 to about 140.

2. A tire tread rubber composition as specified in claim 1 wherein said composition is further comprised of about 30 phr to about 150 phr of a filler.

3. A tire tread rubber composition as specified in claim 2 wherein the repeat units in the isoprene-butadiene rubber are derived from about 30 weight percent to about 40 weight percent isoprene and from about 60 weight percent to about 70 weight percent 1,3-butadiene.

4. A tire tread rubber composition as specified in claim 3 wherein from about 5 percent to about 8 percent of the repeat units in the isoprene-butadiene rubber are 1,2-polybutadiene units, wherein from about 55 percent to about 65 percent of the repeat units in the isoprene-butadiene rubber are 1,4-polybutadiene units, wherein from about 1 percent to about 3 percent of the repeat units in the isoprene-butadiene rubber are 3,4-polyisoprene units, and wherein from about 28 percent to about 36 percent of the repeat units in the isoprene-butadiene rubber are 1,4-polyisoprene units.

5. A tire tread rubber composition as specified in claim 4 wherein the isoprene-butadiene rubber has a Mooney ML1+4 viscosity which is within the range of about 60 to about 100.

6. A tire tread rubber composition as specified in claim 5 wherein the rubber has a glass transition temperature which is within the range of about −85° C. to about −80° C.

7. A tire tread rubber composition as specified in claim 6 wherein over 60 percent of the isoprene in the isoprene-butadiene rubber is present in blocks of three or less repeat units.

8. A tire tread rubber composition as specified in claim 7 wherein the isoprene-butadiene rubber is present in an amount which is within the range of about 20 phr to about 45 phr.

9. A tire tread rubber composition as specified in claim 7 wherein the isoprene-butadiene rubber is present in an amount which is within the range of about 25 phr to about 40 phr.

10. A tire tread rubber composition as specified in claim 7 wherein the isoprene-butadiene rubber is present in an amount which is within the range of about 30 phr to about 35 phr.

11. A tire tread rubber composition as specified in claim 8 wherein the filler is present at a level which is within the range of about 50 phr to about 90 phr.

12. A tire tread rubber composition as specified in claim 9 wherein the filler is present at a level which is within the range of about 60 phr to about 80 phr.

13. A tire tread rubber composition as specified in claim 10 wherein the isoprene-butadiene rubber has a Mooney ML1+4 viscosity which is within the range of about 70 to about 90.

14. A tire tread rubber composition as specified in claim 11 wherein the isoprene-butadiene rubber has a Mooney ML1+4 viscosity which is within the range of about 80 to about 85.

15. A tire tread rubber composition as specified in claim 2 wherein the styrene-butadiene rubber is an emulsion styrene-butadiene rubber.

16. A tire tread rubber composition as specified in claim 8 wherein the styrene-butadiene rubber is an emulsion styrene-butadiene rubber.

17. A tire tread rubber composition as specified in claim 2 wherein the filler includes silica and wherein said composition is further comprised of a silica coupling agent.

18. A tire tread rubber composition as specified in claim 17 wherein the silica coupling agent is selected from the group consisting of 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide and 3,3'-bis(dimethoxyphenylsilyl-2-methylpropyl) disulfide.

19. A tire tread rubber composition as specified in claim 17 wherein the silica coupling agent is 3,3'-bis(triethoxysilylpropyl) tetrasulfide.

* * * * *